United States Patent
Hsieh

(10) Patent No.: US 9,950,516 B1
(45) Date of Patent: Apr. 24, 2018

(54) METHOD OF SLICING AND PRINTING MULTI-COLOUR 3D OBJECT

(71) Applicants: XYZPRINTING, INC., New Taipei (TW); KINPO ELECTRONICS, INC., New Taipei (TW)

(72) Inventor: Shih-Sen Hsieh, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 0 days.

(21) Appl. No.: 15/499,187

(22) Filed: Apr. 27, 2017

(30) Foreign Application Priority Data

Jan. 5, 2017 (TW) .............................. 106100238 A

(51) Int. Cl.
B41J 2/045 (2006.01)
B41J 2/21 (2006.01)
B41J 3/407 (2006.01)

(52) U.S. Cl.
CPC ....... B41J 2/04536 (2013.01); B41J 2/04586 (2013.01); B41J 2/2103 (2013.01); B41J 3/4073 (2013.01)

(58) Field of Classification Search
CPC .. B41J 2/04536; B41J 2/04586; B41J 2/2103; B41J 3/4073
See application file for complete search history.

(56) References Cited

U.S. PATENT DOCUMENTS 9,227,424 B1 * 1/2016 Mantell ................ B29C 64/112
9,826,554 B2   11/2017 Hwang et al.
9,833,948 B2 * 12/2017 Stava .................... B29C 64/386

FOREIGN PATENT DOCUMENTS

WO   WO2015163776 A1   10/2015
WO   WO2016057029 A1   4/2016

OTHER PUBLICATIONS

European search report issued by European Patent Office dated Nov. 9, 2017.
Color Uniformity Improvement for an Inkjet Color 3D Printing System written by Pei-Li Sun et al. extracted from IS&T International Symposium on Electronic Imaging 2016 Color Imaging XXI: Displaying, Processing, Hardcopy, and Applications.

* cited by examiner

*Primary Examiner* — Thinh H Nguyen
(74) *Attorney, Agent, or Firm* — Chun-Ming Shih; HDLS IPR Services

(57) ABSTRACT

A method of slicing and printing multi-color 3D object includes following steps of: executing a path-slicing process to a coordinate information of a multi-color 3D object (22) to generate a plurality of path data; generating a plurality of continuous-tone images according to a color information of the multi-color 3D object (22); calculating a plurality of dithering masks according to a plurality of displacement values and an initial mask; generating a plurality of halftone images according to each dithering mask and the same-layer continuous tone image; and, controlling a modeling nozzle (100) of a multi-color 3D printer (1) to print a plurality of printing slices (S1-S3) according to each path data layer by layer and controlling a coloring nozzle (102) of the multi-color 3D printer (1) to color each of printed printing slice (S1-S3) according to the same-layer halftone image.

11 Claims, 11 Drawing Sheets

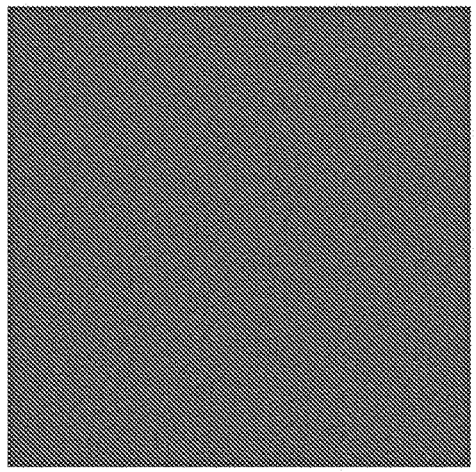
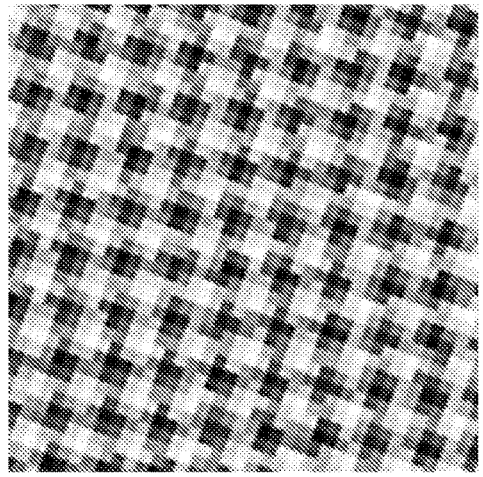
FIG.1A  FIG.1B
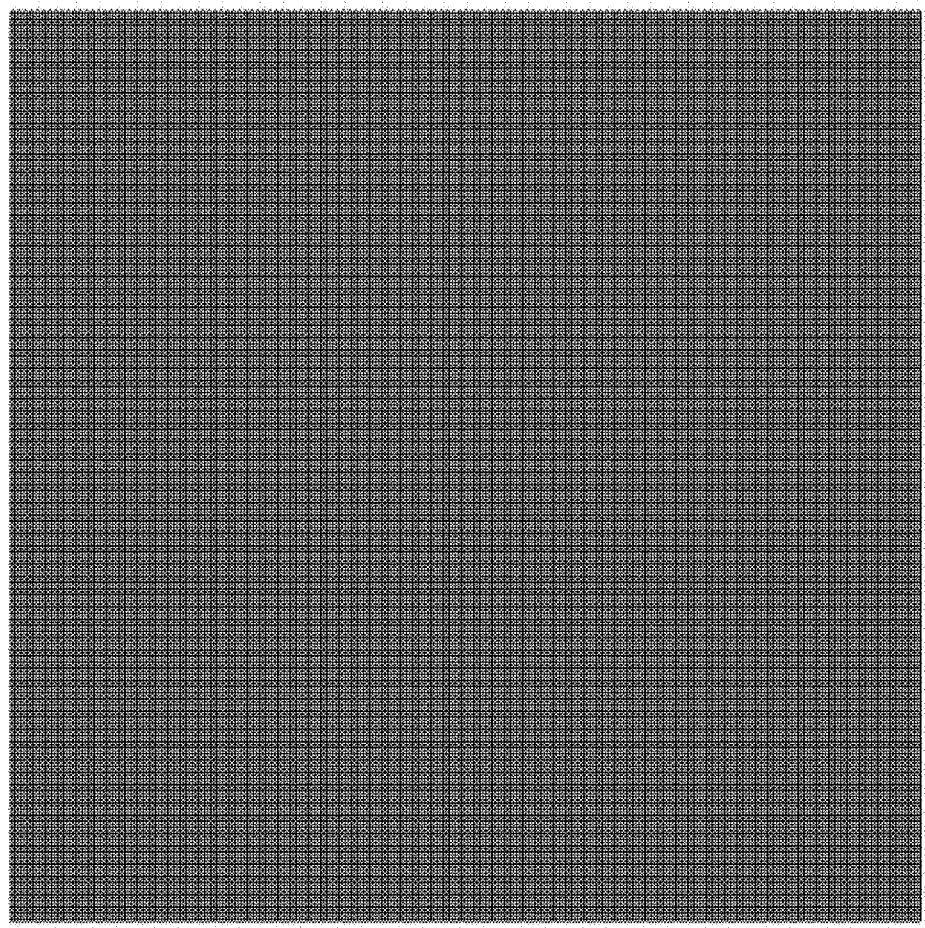
FIG.1C

| 0 | 128 | 32 | 160 |
|---|---|---|---|
| 188 | 64 | 220 | 96 |
| 48 | 176 | 16 | 144 |
| 236 | 112 | 204 | 80 |

FIG.1D

| 127 | 127 | 127 | 127 |
|---|---|---|---|
| 127 | 127 | 127 | 127 |
| 127 | 127 | 127 | 127 |
| 127 | 127 | 127 | 127 |

FIG.1E

| 1 | 0 | 1 | 0 |
|---|---|---|---|
| 0 | 1 | 0 | 1 |
| 1 | 0 | 1 | 0 |
| 0 | 1 | 0 | 1 |

FIG.1F

| 0 | 128 | 32 | 160 | 0 | 128 | 32 | 160 |
|---|---|---|---|---|---|---|---|
| 188 | 64 | 220 | 96 | 188 | 64 | 220 | 96 |
| 48 | 176 | 16 | 144 | 48 | 176 | 16 | 144 |
| 236 | 112 | 204 | 80 | 236 | 112 | 204 | 80 |
| 0 | 128 | 32 | 160 | 0 | 128 | 32 | 160 |
| 188 | 64 | 220 | 96 | 188 | 64 | 220 | 96 |
| 48 | 176 | 16 | 144 | 48 | 176 | 16 | 144 |
| 236 | 112 | 204 | 80 | 236 | 112 | 204 | 80 |

FIG.8

METHOD OF SLICING AND PRINTING MULTI-COLOUR 3D OBJECT

BACKGROUND OF THE INVENTION

Field of the Invention

The technical field relates to 3D printing and more particularly related to a method of slicing and printing multi-colour 3D object.

Description of Related Art

A multi-colour 3D printer having ability of printing a multi-colour object had been provided currently. Above-mentioned multi-colour 3D printer executes print by performing following printing method.

In the first, the multi-colour 3D printer loads the 3D data and executes a slicing process to the loaded 3D data for generating a plurality of path information and halftone images corresponding to the different printing slices. Then, the multi-colour 3D printer controls a modeling nozzle to print a plurality of printing slices according to a plurality of path information, and controls a coloring nozzle to color each printed printing slice according to the same-layer halftone image. Thus, the multi-colour 3D printer can generates a multi-colour 3D physical model stacked with the plurality of the colored printing slices.

Above-mentioned multi-colour 3D printer generates each layer of the halftone image by using the same halftone mask to generate during executing the slicing process, such that a false contour of each layer of the halftone image will be appeared on the same horizontal position of each layer, the phenomenon of false contouring will appear on the generated multi-colour 3D physical model in a direction of the Z-axis and make the coloring quality bad.

SUMMARY OF THE INVENTION

The present disclosed example is directed to a method of slicing and printing multi-colour 3D object having ability of generating the different layers of the halftone images by respectively using the different dithering masks.

One of the exemplary embodiments, a method of slicing and printing multi-colour 3D object, comprises:

a) loading coordinate information of a multi-colour 3D object and executing a path-slicing process to the coordinate information for generating a plurality of path data of a plurality of printing slices;

b) loading colour information of the multi-colour 3D object and generating a plurality of continuous-tone images respectively corresponding to the plurality of the printing slices according to the colour information;

c) calculating a plurality of dithering masks respectively corresponding to the plurality of the printing slices according to a plurality of displacement values and an initial mask;

d) generating a plurality of halftone images respectively corresponding to the plurality of the printing slices according to each same-layer dithering mask and each same-layer continuous tone image; and e) controlling a modeling nozzle of a multi-colour 3D printer to print the plurality of the printing slices according to the plurality of the path data layer by layer and controlling a coloring nozzle of the multi-colour 3D printer to color each printed printing slice according to the corresponded halftone image.

The present disclosed example can effectively prevent from a phenomenon of false contouring, so as to increase the coloring quality via using the different dithering masks to generate the different layers of the halftone images for coloring.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

FIG. 1A is a schematic view of a gray-scale image;
FIG. 1B is a schematic view of a halftone mask;
FIG. 1C is a schematic view of a halftone image;
FIG. 1D is a schematic view of an array of a halftone mask;
FIG. 1E is a schematic view of an array of a gray-scale image;
FIG. 1F is a schematic view of an array of a halftone mask;
FIG. 8 is a schematic view of a displacement of a halftone mask of the present disclosed example.

DETAILED DESCRIPTION OF THE INVENTION

Figure 2:
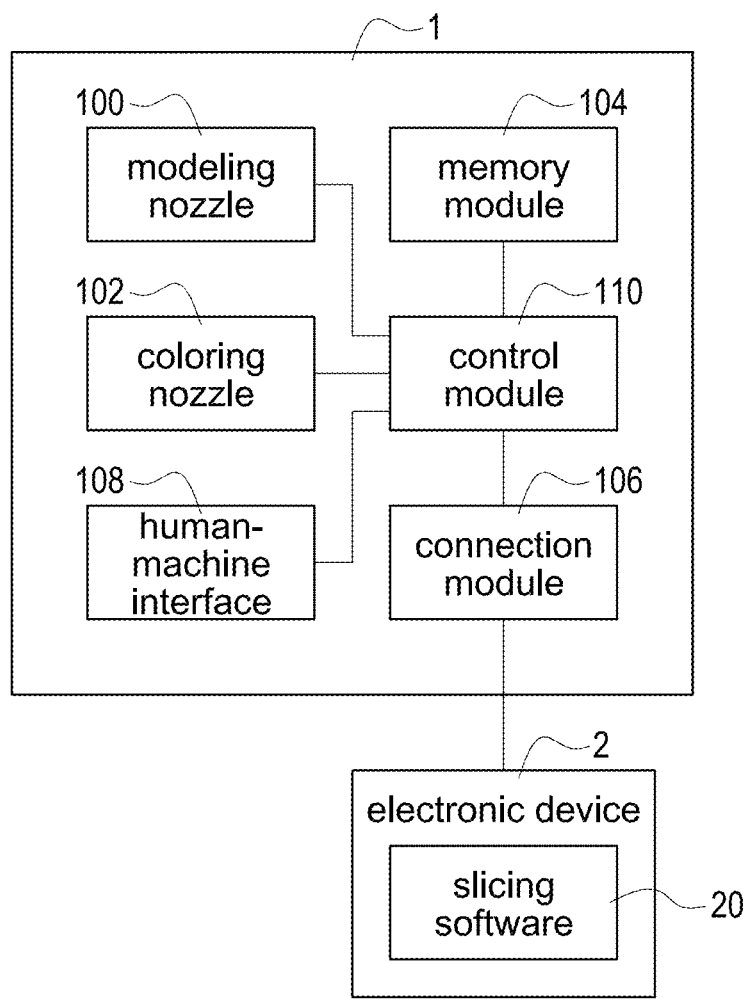
FIG. 2 is an architecture diagram of a multi-colour 3D printer according to a first embodiment of the present disclosed example.

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

First, the description will disclose an inkjet printing technology. Because of using a halftone printing technology, each of nozzles of a 2D inkjet printer only has ability of either jetting out the ink or not. Namely, each printing point only has ability of appearing either an original colour of a printing material or an ink colour, the 2D inkjet printer has no ability of implementing single-point continuous-scale printing via controlling the amount of ink jetted each time. As a result, the general 2D inkjet printer only has ability of outputting the halftone image (pixel value is either 0 or 1), and has no ability of outputting the continuous-tone image (the range of pixel value is continuous, such as 0-255) displaying in a display generally.

For making the outputted halftone image appear a visual effect of the continuous-tone image, the halftone printing technology implements the visual effect of the continuous-tone image based on a low sensitivity of high frequency of human eyes (the human visual system is just like a low-pass filter) via adjusting a density of a plurality of inkjet points.

For example, the evenly distributed inkjet points will be mistakenly recognized as a gray region by human visual system. If the density of inkjet points is larger, the human visual system will mistakenly recognize that the colour is deeper, and vice versa.

Please refer to FIG. 1A to FIG. 1F, FIG. 1A is a schematic view of a gray-scale image, FIG. 1B is a schematic view of a halftone mask, FIG. 1C is a schematic view of a halftone image, FIG. 1D is a schematic view of an array of a halftone mask, FIG. 1E is a schematic view of an array of a gray-scale image, FIG. 1F is a schematic view of an array of a halftone mask. FIG. 1A to FIG. 1F is used to explain a phenomenon of false contouring in a halftone image.

Like the general halftone mask, a halftone mask shown in FIG. 1B comprises a plurality of elements which are arranged regularly (take being arranged in lattice for example). After executing a halftoning process to a gray-scale image shown in FIG. 1A by the halftone mask shown in FIG. 1B, it will generate a halftone image as shown in FIG. 1C. Besides, when the human visual system watches above-mentioned halftone image at a specific distance, the human visual system will perceive the false contour (in this example, the false contour is lattice false contour) corresponding to above-mentioned regular arrangement in this halftone image, above-mentioned phenomenon is just the phenomenon of false contouring.

Following description will explain a reason of causing the phenomenon of false contouring. In the image-processing technology, any mask and image can be expressed by a matrix (such as the matrixes shown in FIG. 1D to FIG. 1F). When executing the halftoning process, an element value of each element of the halftone mask (such as the mask of the Ordered Dithering Method shown in FIG. 1D) is compared with a pixel value of a corresponded position of the gray-scale image as shown in FIG. 1E one-by-one. If the pixel value of the gray-scale image is not less than the element value of the element of the corresponded position of the halftone mask, a pixel value of the corresponded position of the halftone image as shown in FIG. 1F will be configure to 1. If the pixel value of the gray-scale image is less than the element value of the corresponded position of the halftone mask, the pixel value of the corresponded position of the halftone image will be configure to 0. Thus, the halftone image will be generated.

For example, because the pixel value (127) of the upper right pixel of the gray-scale image is less than the element value of the upper right element of the halftone mask, the pixel value of the upper right pixel of the halftone image is configured to 0. Because the pixel value (127) of the upper left pixel of the gray-scale image is not less than the element value of the upper left element of the halftone mask, the pixel value of the upper left pixel of the halftone image is configured to 1. Because the pixel value (127) of the lower right pixel of the gray-scale image is not less than the element value of the lower right element of the halftone mask, the pixel value of the lower right pixel of the halftone image is configured to 1.

Because there is a close relationship between the element values of the halftone mask and the pixel values of the gray-scale image, when a distribution of the element values comprises a specific rule (in FIG. 1D, the specific rule is that the larger element values and the smaller element values are arranged in diagonal cross), the distribution of the pixel values of the generated halftone image will also comprises above-mentioned specific rule.

Additionally, in another example of the halftoning process, a size of the gray-scale image often is larger than a size of the halftone image, so the halftone mask must be respectively compared to the different blocks. Because of still using the same halftone mask, above-mentioned scheme will make the generated halftone image appear the phenomenon of lattice false contouring (a range of the lattice false contour corresponds to the size of the halftone mask).

Thus, when using above-mentioned halftone technology in multi-dour 3D printing, because of using the same halftone mask to generate each layer of the halftone images, the false contour may be appeared on the same horizontal (X-Y plane) position of each layer because of using the same halftone mask to generate each layer of the halftone images, such that a side wall of the generated multi-colour 3D model may appear the phenomenon of false contouring in Z-axis direction and the multi-colour 3D model has bad quality.

Please refer to FIG. 2, which is an architecture diagram of a multi-colour 3D printer according to a first embodiment of the present disclosed example. This embodiment discloses a multi-colour 3D printing system comprising a multi-colour 3D printer and a slicing software 20. After the slicing software 20 is executed by an electronic device 2 (such as desktop computer, laptop, cloud server, or smartphone), the slicing software 20 can control the electronic device 2 to load a 3D data of a multi-colour 3D object, executing a slicing process via modifying the 3D data, and, generating 3D printing data (such as the path data or halftone images described later, the 3D data can be express with a form of G-code). The multi-colour printer 1 can execute print according to the 3D printing data for generating a multi-colour 3D physical model corresponding to the multi-colour 3D object.

The multi-colour 3D printer 1 mainly comprises a modeling nozzle 100, a coloring nozzle 102, a memory module 104, a connection module 106, a human-machine interface 108 and a control module 110.

The modeling nozzle 100 is connected to a device of providing printing consumable (not shown in figure), and can use the printing consumable to execute 3D print.

In one embodiment of the present disclosed example, the multi-colour 3D printer 1 is a Fused Deposition Modeling (FDM) 3D printer, the device of providing printing consumable can provide the thermoplastic printing consumable, such as Acrylonitrile Butadiene Styrene (ABS) or Polylactic Acid (PLA), to the modeling nozzle 100, the modeling nozzle 100 can heat the thermoplastic printing consumable to a semi-molten state for executing 3D printing.

In one embodiment of the present disclosed example, the multi-colour is Stereolithographic (SL) 3D printer, the device of providing printing consumable can provide liquid UV curable resin to the modeling nozzle 100, the modeling nozzle can jet out the UV curable resin and irradiate (such as irradiation of ultraviolet light or laser light) the jetted UV curable resin to solidify the irradiated UV curable resin solidify for executing 3D printing.

The coloring nozzle 102 is connected to an ink cartridge (not shown in figure) filled with the ink. In one embodiment of the present disclosed example, the coloring nozzle 102 can comprises a plurality of sub-nozzles, the sub-nozzle are respectively connected to a plurality of ink cartridges having the different colors (such as cyan, magenta, yellow, and black) of ink respectively. The coloring nozzle 102 can implement full-colour printing via mixing the different colors of ink.

The memory module 104 is used to store data (such as above-mentioned 3D printing data). The connection module 106 (such as USB module, PCI bus module, Wi-Fi module or Bluetooth module) is used to be connected to the electronic device 2, and receives the 3D data from the electronic device 2. The human-machine interface 108 (such as button, display, indicator, buzzer, or any combination of above-mentioned device) is used to receive a user's operation and output the print-related information.

The control module 110 can control the modeling nozzle 100 and the coloring nozzle 102 to execute print according to the 3D data.

Figure 3:
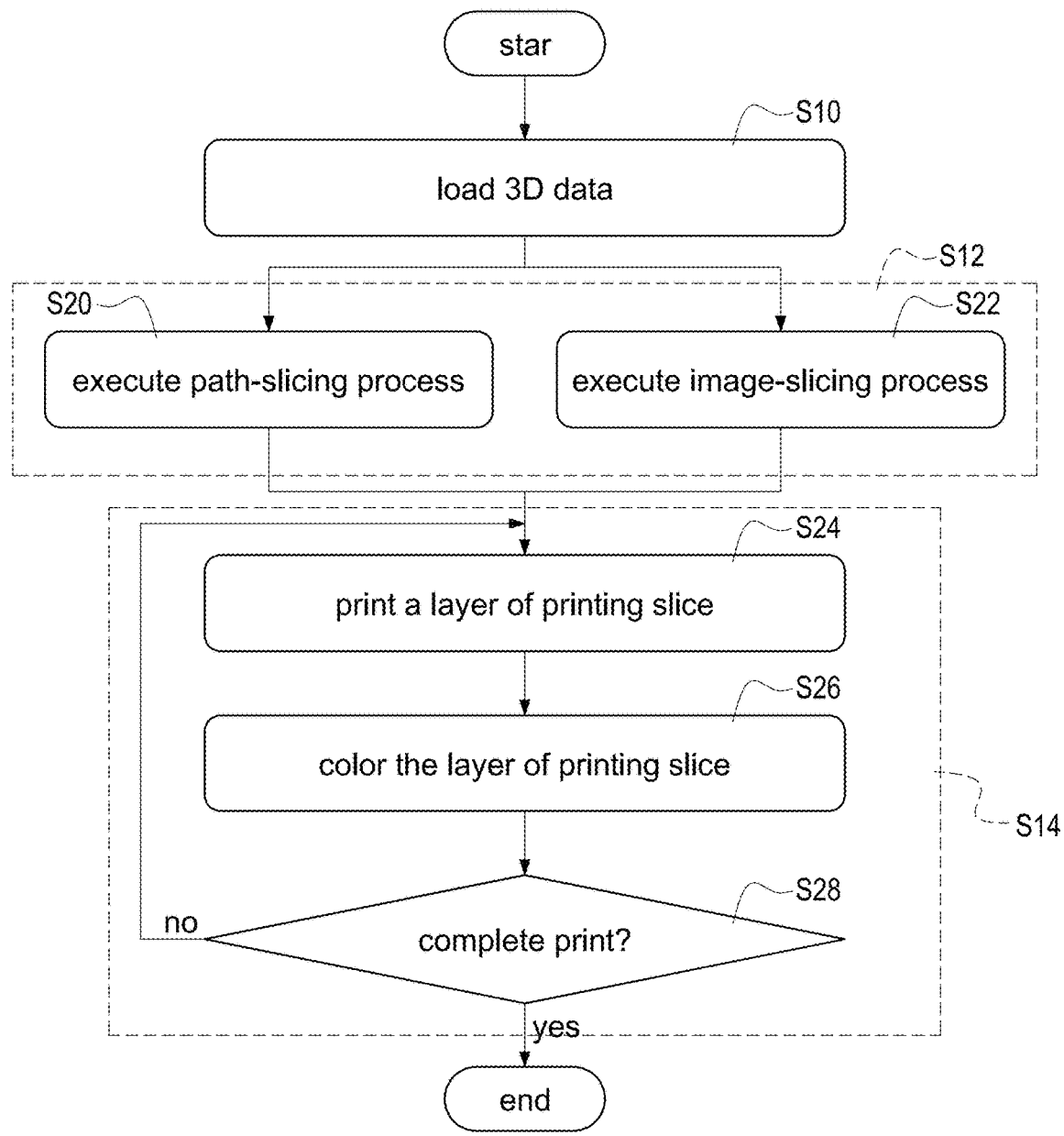
FIG. 3 is a flowchart of a method of printing and slicing according to a first embodiment of the present disclosed example.

Please refer to FIG. 3, which is a flowchart of a method of printing and slicing according to a first embodiment of the present disclosed example. For solving above-mentioned problem of false contouring, the present disclosed example discloses a method of slicing and printing multi-colour 3D object (hereinafter the method of slicing and printing). Each embodiment of the present disclosed example is mainly adopted in the multi-colour 3D printing system shown in FIG. 2.

In the embodiment shown in FIG. 3, after the slicing software 20 is executed by the electronic device 2 or the multi-colour 3D printer 1 (take the electronic device 2 executing the slicing software 20 for example in following description), the slicing software 20 can control electronic device 2 or the multi-colour 3D printer 1 to perform steps S10-S12.

Figure 7A:
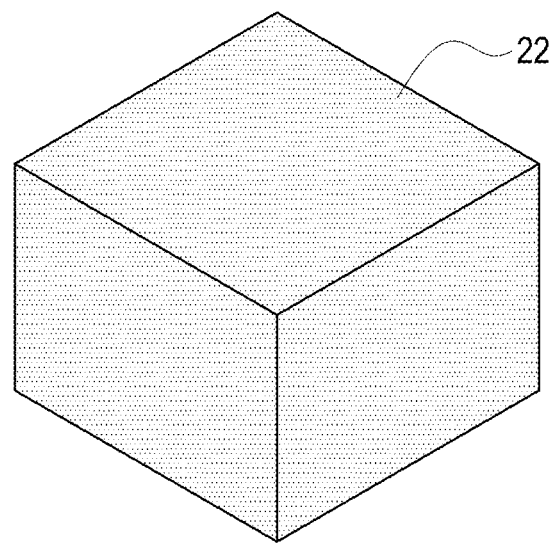
FIG. 7A is a schematic view of a multi-colour 3D object of the present disclosed example.

Step S10: the electronic device 2 loads the 3D data of the multi-colour 3D object (such as the multi-colour 3D object 22 shown in FIG. 7A). More specifically, the 3D data is a file in OBJ file format or a file in PLY file format which are edited by the user in advance, and the 3D data records the multi-colour 3D object which the user wants to print. The electronic device 2 can load coordinate information and colour information of the multi-colour 3D object after load the 3D data.

In one embodiment of the present disclosed example, the coordinate information comprises a plurality of coordinates in X-axis, Y-axis and Z-axis based on the multi-colour 3D printer, each coordinate is respectively corresponded to one point of the multi-colour 3D object. The colour information comprises a plurality of colour-scale values of the plurality of printing points in a specific colour space (such as RGB colour space); each colour-scale value is respectively corresponded to one point of the multi-colour 3D object.

Step S12: the electronic device 2 executes the slicing process to the loaded 3D data, and transfers the 3D printing data generated by the slicing process to the multi-colour 3D printer 1 for executing 3D printing.

In one embodiment of the present disclosed example, after the electronic device 2 retrieves the coordinate information and the colour information of the multi-colour 3D object, the electronic device 2 executes two different types of slicing processes, one is a path-slicing process (step S20) which is directed to the body of the multi-colour 3D object, another one is an image-slicing process (step S22) which is directed to the image of the multi-colour 3D object.

Besides, in this embodiment of the present disclosed example, the method of slicing and printing can generate a plurality of path data of a plurality of printing slices after executing the path-slicing process, and generate a plurality of halftone images of the plurality of the printing slices after executing the image-slicing process.

In one embodiment of the present disclosed example, each path data and each halftone image respectively record a layer value; the layer value is used to describe a layer value of the printing slice corresponding to each path data and each halftone image. For example, the layer value of the first layer of path data/halftone image is 1, the layer value of the tenth layer of path data/halftone image is 10, the layer value of the hundredth layer of path data/halftone image is 100, and so on.

In one embodiment of the present disclosed example, the total number of the path data, the total number of the halftone images and the total number of the printing slices are the same.

Step S14: the multi-colour 3D printer 1 executes 3D print according to the 3D printing data generated by the slicing process layer by layer for generating the multi-colour 3D physical model.

In one embodiment of the present disclosed example, the multi-colour 3D printer 1 first controls the modeling nozzle 100 to print a layer of printing slice (step S24) according to a layer of path data (such as the first layer of path data). Then the multi-colour 3D printer 1 controls the coloring nozzle 102 to color the layer of the printed printing slice (step S26) according to the same-layer halftone image (namely, the halftone image has the same layer value or is corresponded to the same printing slice). Thus, the multi-colour 3D printer 1 completes printing and coloring one layer of the printing slice. After this, the multi-colour 3D printer 1 determines whether all the printing slices have been printed (and colored). Namely, the multi-colour 3D physical model has been generated completely. The multi-colour 3D printer 1 ends print when determining that print completed, or performs the step S24 again for continuing to print the next layer of the printing slice when determining that print doesn't complete.

Figure 4:
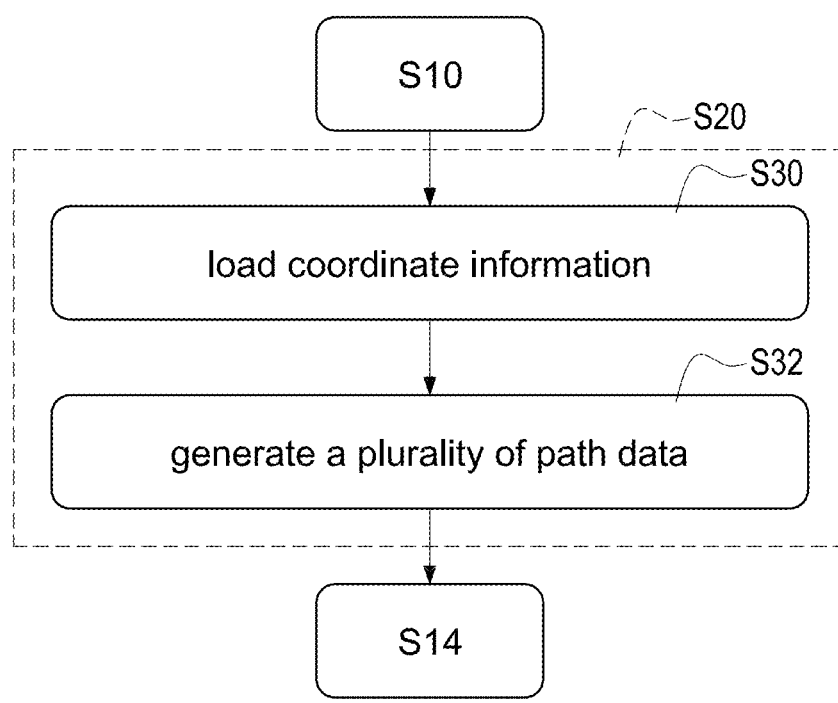
FIG. 4 is a partial flowchart of a method of printing and slicing according to a second embodiment of the present disclosed example.
Figure 7B:
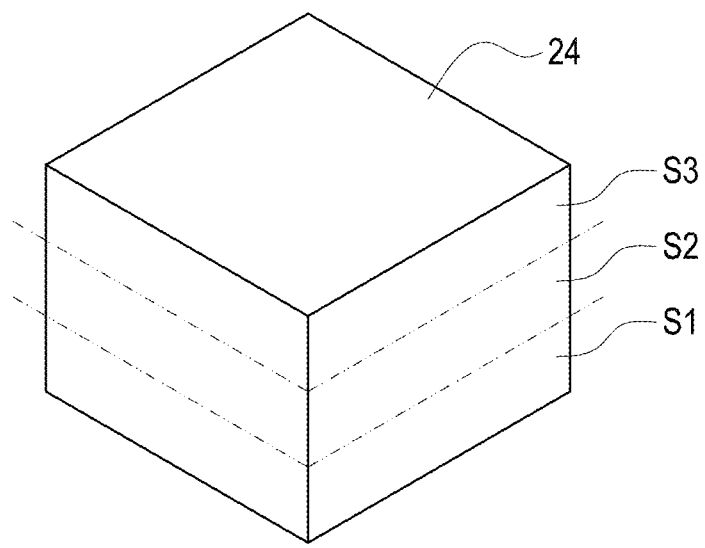
FIG. 7B is a schematic view of path-slicing process of the present disclosed example.
Figure 7C:
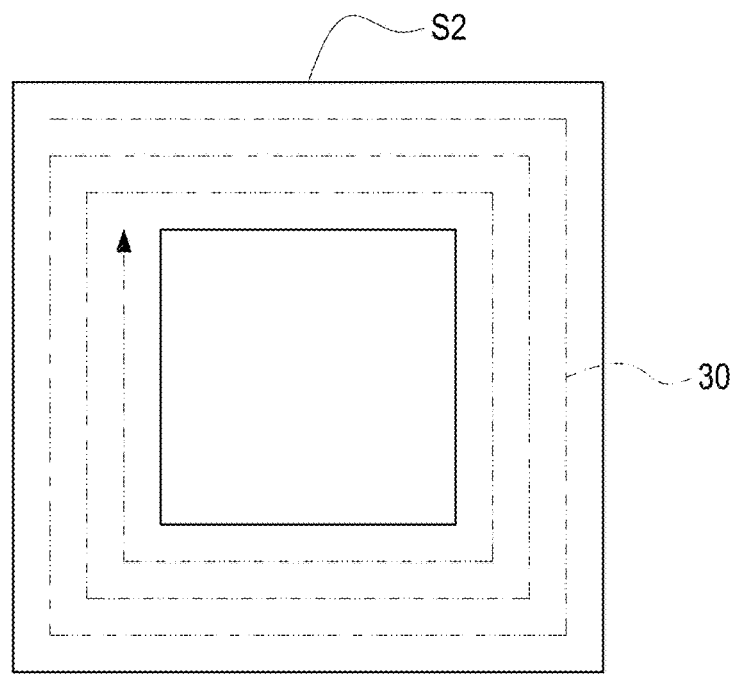
FIG. 7C is a schematic view of path data of the present disclosed example.

Please refer to FIG. 3, FIG. 4 and FIG. 7A to FIG. 7C simultaneously, FIG. 4 is a partial flowchart of a method of printing and slicing according to a second embodiment of the present disclosed example, FIG. 7A is a schematic view of a multi-colour 3D object of the present disclosed example, FIG. 7B is a schematic view of path-slicing process of the present disclosed example, FIG. 7C is a schematic view of path data of the present disclosed example. Compare to the embodiment shown in FIG. 3, in the embodiment shown in FIG. 4, the step S20 of the method of printing and slicing comprises following steps.

Step S30: the electronic device 2 loads a plurality of coordinates of the coordinate information. More specifically, above-mentioned coordinates describe a shape structure of the multi-colour object 22 (as shown in FIG. 7A) together.

Step S32: the electronic device 2 executes the path-slicing process for generating a plurality of the path data of the plurality of the printing slices according to a default slice thickness or a default layer number of slices, wherein the multi-colour 3D object is stacked by the plurality of the printing slices.

In one embodiment of the present disclosed example, each path data comprises a plurality of coordinates. Besides, the number of the plurality of the path data and the layer number of slices are the same. For example, if the multi-colour 3D object could be sliced in to one hundred layers of slices, one hundred path data will be generated after the path-slicing process. The one hundred path data correspond to the one hundred layers of slices, and respectively describe the printing path of the corresponded printing slice.

For example, as shown in FIG. 7B, when executing the path-slicing process, the multi-colour 3D object 22 will first be transformed into a 3D object 24 without the colour information, the 3D object 24 can be slice into three layers of printing slices S1-S3 after the path-slicing process. Each printing slice S1-S3 can be respectively described with a printing path constituted by a plurality of the coordinates. As shown in FIG. 7C, the printing slice S2 corresponds to the printing path 30. Namely, the modeling nozzle 100 can print a layer of the physical printing slice corresponding to the printing slice S2 when executing printing alone the printing path 30.

Figure 7D:
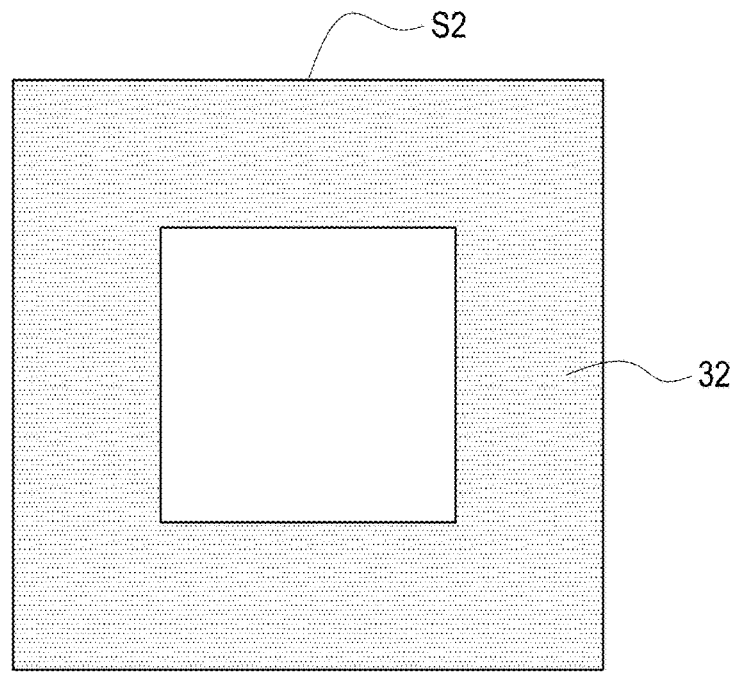
FIG. 7D is a schematic view of a continuous-tone image of the present disclosed example.

Please simultaneously refer to FIG. 3, FIG. 5, FIG. 7A, FIG. 7B and FIG. 7D, FIG. 5 is a partial flowchart of a method of printing and slicing according to a third embodiment of the present disclosed example, FIG. 7D is a schematic view of a continuous-tone image of the present disclosed example. Compare to the embodiment shown in FIG. 3, in the embodiment shown in FIG. 4, the step S22 of the method of slicing and printing comprises following steps.

Step S40: the electronic device 2 load the colour information, wherein the colour information comprises a plurality of colour-scale values of the plurality of printing points of the multi-colour 3D object in a specific colour space.

Step S42: the electronic device 2 generates the plurality of the continuous-tone images respectively corresponding to the plurality of the printing slices.

In one embodiment of the present disclosed example, each continuous-tone image records above-mentioned layer number and is used to describe the colour of each printing slice respectively.

For example, as shown in FIG. 7D, the continuous-tone image can describe the position and the colour-scale value of each pixel located at a coloring region 32 of the printing slice S2. Besides, each coordinate of the same-layer path data corresponds to each pixel of the coloring region 32 of the continuous-tone image. Thus, the present disclosed example can obtain the colour-scale value (namely, the pixel value of the corresponded pixel) of each coordinate via referring to the continuous-tone image.

Step S44: the electronic device 2 executes a colour space-transforming process to the colour information for transforming the plurality of the continuous-tone images from a colour space being suitable for display into another colour space being suitable for print.

For example, when the coloring nozzle 102 is connected to a black ink cartridge, the electronic device 2 must transform the colour information from RGB colour space into gray-scale colour space. Besides, the continuous-tone image before transforming into gray-scale colour space comprises a red (R) image, a green (G) image and a blue (B) image of each layer. Because arranging only the black ink cartridge, the continuous-tone image after transforming into gray-scale colour only comprises the gray-scale image of each layer.

Thus, this embodiment of the present disclosed example can effectively transform the colour information into the colour space being suitable for print.

Step S46: the electronic device 2 calculates a plurality of dithering masks respectively corresponding to the plurality of the printing slices according to a plurality of the displacement values and an initial mask. More specifically, the electronic device 2 first retrieves the plurality of the displacement values respectively corresponding to the plurality of the printing slices, and then the electronic device 2 calculates each dithering mask respectively corresponding to each layer of printing slice according to each displacement value of each printing slice.

In one embodiment of the present disclosed example, each dithering mask records the layer value.

In one embodiment of the present disclosed example, the initial mask is pre-configured by the user. Besides, the plurality of the displacement values can be retrieved via user pre-configuring, calculating according to the initial mask or generating by random. The plurality of the displacement values can be completely different or only partially different each other, but this specific example is not intended to limit the scope of the present disclosed example.

In one embodiment of the present disclosed example, the electronic device 2 calculates the displacement value of each layer of printing slice according to the layer number of each printing slice and a default unit displacement value, and calculates the dithering mask of this printing slice according to the calculated displacement value and the initial mask. More specifically, the electronic device 2 can calculate the displacement value (Sx, Sy) of the specific printing slice via following formula (i).

$(Sx, Sy) = (n \times x, n \times y)$ formula (i), wherein "Sx" represents the displacement value in X-axis, "Sy" represents the displacement value in Y-axis, "n" represents the layer number of this current printing slice, "x" represents the unit displacement value in X-axis, and "y" represents the unit displacement value in Y-axis.

Take the unit displacement value (x, y) being (2, 1) for example, the displacement value of the fifth layer of the printing slice is (5×2, 5×1) equaling (10, 5); the displacement value of the eighth layer of the printing slice is (8×2, 8×1) equaling (16, 8), and so on.

In one embodiment of the present disclosed example, the unit displacement value is determined according to the initial mask. More specifically, the unit displacement value in X-axis is the maximum difference between those horizontal elements of the initial mask, the unit displacement value in Y-axis is the maximum difference between those vertical elements of the initial mask.

Then, the electronic device 2 can calculates the dithering mask of each printing slice according to the displacement value of each printing slice and the initial mask.

Please refer to FIG. 8, which is a schematic view of a displacement of a halftone mask of the present disclosed example. in one embodiment of the present disclosed example, the electronic device 2 first repeatedly copies the initial mask (take matrix $$\begin{bmatrix} 0 & 128 & 32 & 160 \\ 188 & 64 & 220 & 96 \\ 48 & 176 & 16 & 144 \\ 236 & 112 & 204 & 80 \end{bmatrix}$$

for example) and splices these copied initial masks into an infinite loop matrix M (FIG. 8 takes splicing four copied initial masks for example), and calculating the corresponded dithering mask according to the displacement value of each printing slice.

For example, if the displacement value of the first layer of printing slice is (0, 0), the displacement value of the second layer of printing slice is (2, 1), and the displacement value of the third layer of printing slice is (4, 2), the electronic device 2 can obtain the matrix M1 which is the dithering mask of the first layer of printing slice, the matrix M2 (shifting 2 units in X-axis and 1 units in Y-axis from the position of M1) which is the dithering mask of the second layer of printing slice, and the matrix M3 (shifting 4 units in X-axis and 2 units in Y-axis from the position of M1) which is the dithering mask of the third layer of printing slice after executing a displacement-calculating according to the matrix M.

Thus, the present disclosed example can generate a plurality of dithering masks by only using a single mask.

Figure 5:
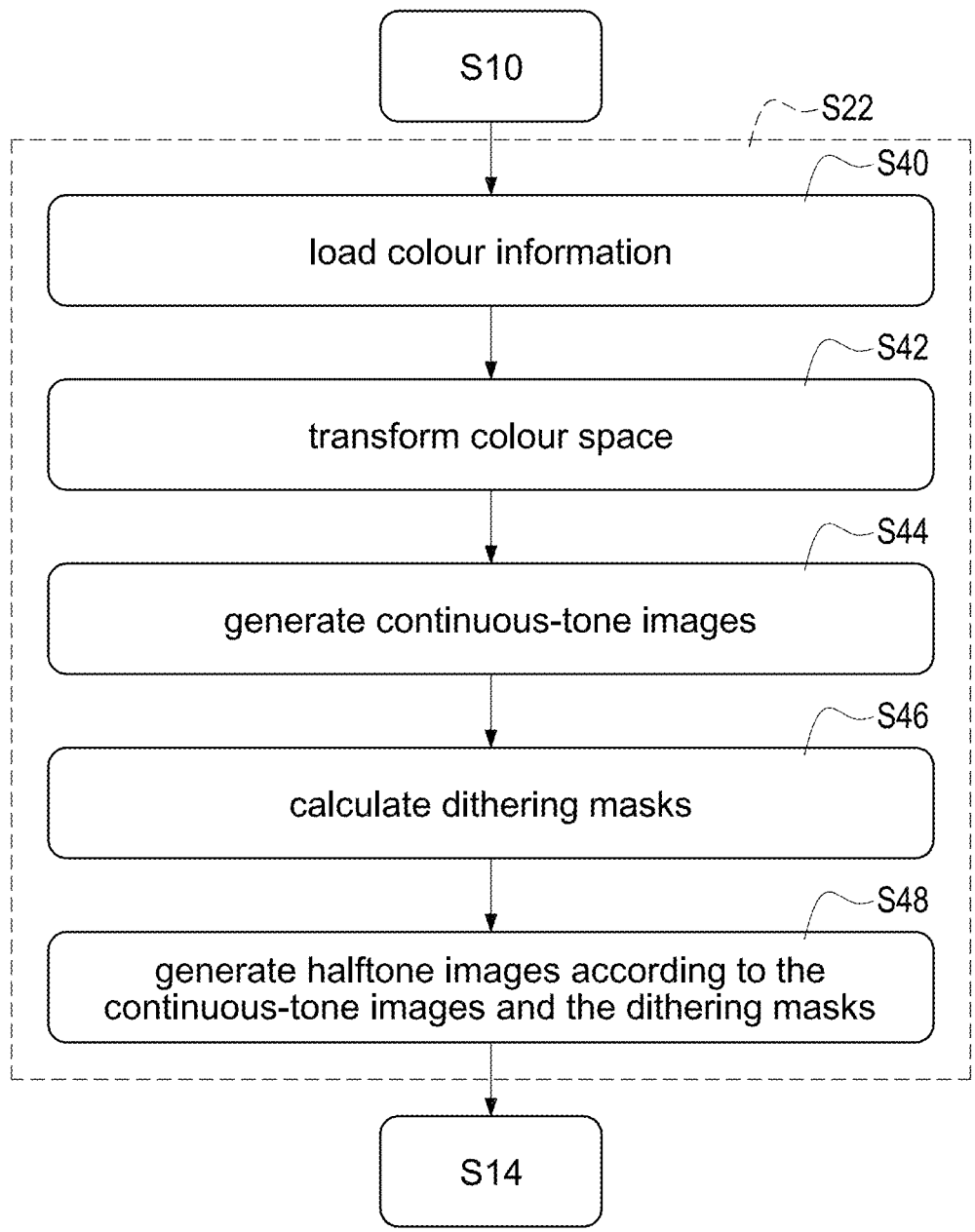
FIG. 5 is a partial flowchart of a method of printing and slicing according to a third embodiment of the present disclosed example.

Please refer to FIG. 5, a step S48 is performed: the electronic device 2 executing the half toning process to the continuous-tone image of each printing slice by the dithering mask of the same-layer printing slice for obtaining the halftone image of each printing slice.

Please be noted that, the plurality of the generated halftone images corresponds to the colour of the ink cartridge connected to the coloring nozzle 102. Take black ink cartridge for example, the plurality of the halftone images are black halftone images and corresponds to a distribution of black inkjet points. Namely, the multi-colour 3D printer 1 is to jet the drops of black ink (jetting if the pixel value is 0, do not jet if the pixel value is 1) to each position of the printing slice according to the pixel value of the halftone image when coloring. In another example, a cyan ink cartridge is used, the plurality of the halftone images are cyan halftone images and corresponds to a distribution of cyan inkjet points.

Please be noted that, because the dithering masks corresponding to the halftone images generated by the present disclosed example are not exactly the same each other, after respectively coloring all the printing slices according to all the halftone images during 3D printing (step S14), the present disclosed example can make the false contour be appeared on the different horizontal position of each layer of printing slice, and make a side wall of the generated multi-colour 3D model may not appear the phenomenon of false contouring in Z-axis direction, so as to increase the quality of the generate multi-colour 3D model.

Figure 6:
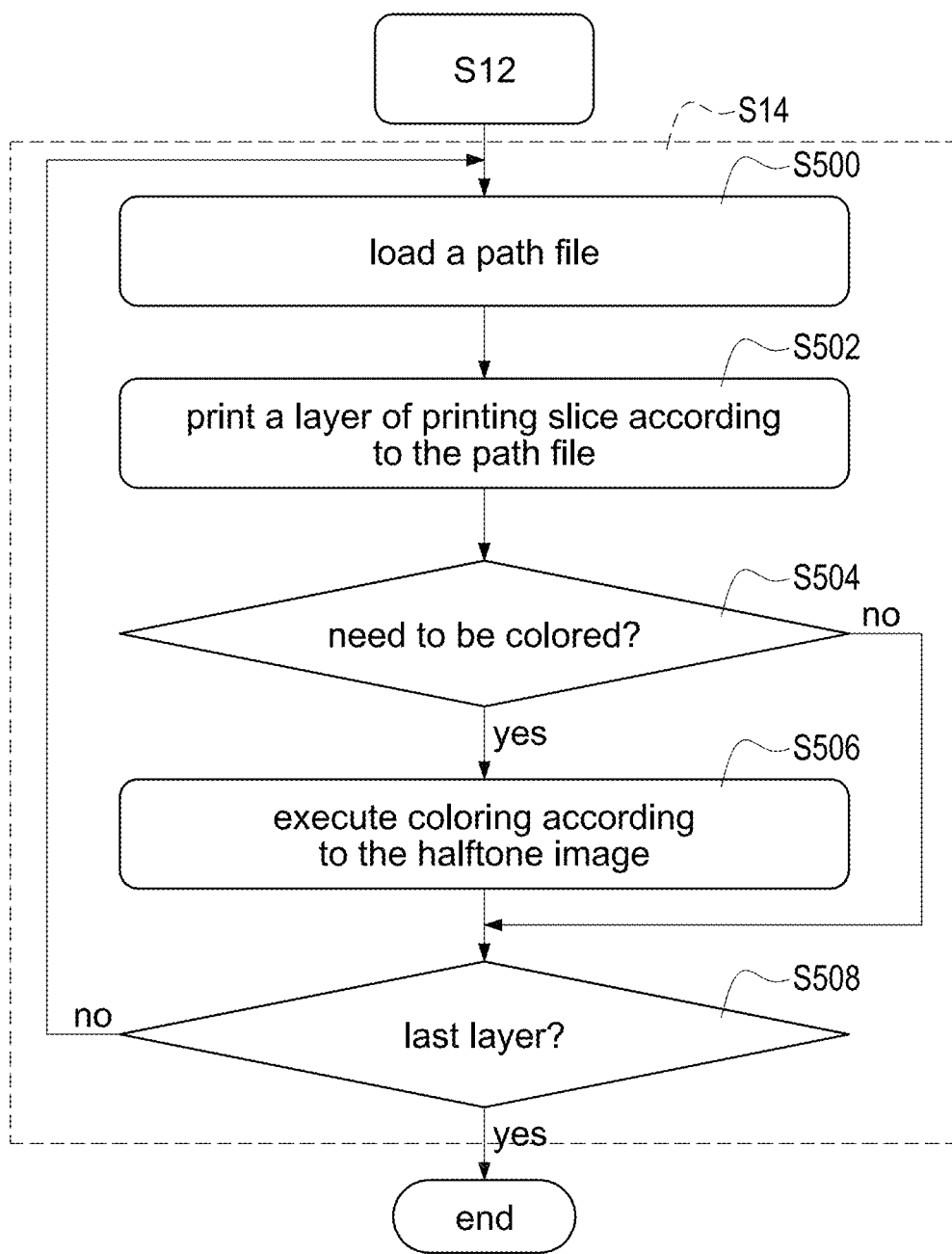
FIG. 6 is a partial flowchart of a method of printing and slicing according to a fourth embodiment of the present disclosed example.

Please refer to FIG. 3 and FIG. 6 simultaneously, FIG. 6 is a partial flowchart of a method of printing and slicing according to a fourth embodiment of the present disclosed example. compare to the embodiment shown in FIG. 3, in the embodiment shown in FIG. 5, the step S14 of the method of slicing and printing comprises following steps.

Step S500: the control module 110 of the multi-colour 3D printer 1 loads one of the path data.

Step S502: the control module 110 controls the modeling nozzle 100 to print a layer of the printing slice according to the loaded path data.

In one embodiment of the present disclosed example, the control module 100 is to control the modeling nozzle 100 to move and print a layer of the printing slice along the printing path described by the path data. Namely, the control module 100 controls the modeling nozzle 100 to move and print between the coordinates comprised in the printing path.

Step S504: the control module 110 loads the halftone image being the same-layer as the path data loaded in the step S502, and determines whether the current printing slice needs to be colored according to the loaded halftone image.

In one embodiment of the present disclosed example, the control module 110 determines whether the printing slice needs to be colored according to the pixel value of the pixel of the loaded halftone image. Namely, determine the printing slice needs to be colored when the pixel value of any pixel is 1 (needing to jet the ink).

In one embodiment of the present disclosed example, if a layer of printing slice doesn't need to be colored, the halftone image of this layer of printing slice will not be generated during the image-slicing process. Namely, the continuous-tone image of this layer of printing slice will not be generated in the step S42, the dithering mask of this layer of printing slice will not be calculated in step S46, and the halftone image of this layer of printing slice will not be generated in the step S48. Thus, when the control module 110 determines that there is no halftone image corresponding to this printing slice, or the halftone image is an empty image, the control module 110 can directly determine that this printing slice doesn't needs to be colored.

If the control module 110 determines that this printing slice needs to be colored, the control module 110 performs a step S506. Otherwise, the control module 110 performs a step S508.

Step S506: the control module 110 controls the coloring nozzle 102 to color the printed printing slice according to the loaded halftone image.

In one embodiment of the present disclosed example, each path data comprises a plurality of the coordinates, the same-layer halftone image records a plurality of colour-scale values (such as 1 or 0) respectively corresponding to the plurality of the coordinates. The control module 110 controls the coloring nozzle 102 (take connecting to the black ink cartridge for example) inkjets drops of black ink at each positions corresponding to each coordinate on the printed printing slice according to each colour-scale value.

In one embodiment of the present disclosed example, the control module 110 controls the coloring nozzle 102 move to the position of the coordinate when the colour-scale value is 0, and inkjets at the current position according to the corresponded colour-scale value. The control module 110 doesn't control the coloring nozzle 102 inkjet at the position of the coordinate when the colour-scale value is 1.

Step S508: the control module 110 determines whether the printed colored printing slice is the last layer of the printing slice according to the layer value.

If the control module 100 determines that this printing slice is not the last layer of the printing slice, the control module 100 performs the steps S500-S508 again for printing and coloring the next-layer of printing slice.

Thus, via executing coloring to the different printing slices according to the halftone images respectively generated by the different dithering masks, the present disclosed example can print the multi-colour 3D physical model without the obvious phenomenon of false contouring.

Although the present disclosed example only generates the different layers of the halftone images corresponding to the black ink cartridge in above-mentioned embodiment, but this specific example is not intended to limit the scope of the present disclosed example.

In one embodiment of the present disclosed example, the present disclosed example can generates a plurality of groups of halftone images, these groups respectively corresponds to the different colours of ink cartridges and comprises the different colours of halftone images each other. Each group of halftone images is consisted of the different layers of same-colour halftone image.

For example, if the coloring nozzle 102 comprises a plurality of sub-nozzles (taking four sub-nozzles for example), each sub-nozzle is respectively connected to the different colour of ink cartridges (taking four colours CMYK for example).

When the electronic device 2 executes the image-slicing process as shown in FIG. 5, the electronic device 2 can transform the RGB colour space into the CMYK colour space (step S44).

More specifically, before transforming into the CMYK colour space, the plurality of the continuous-tone images comprises each layer of red (R) image, each layer of green (G) image and each layer of blue (B) image. After transforming into the CMYK colour space, the plurality of the continuous-tone images comprises each layer of cyan (C) image (first continuous-tone image), each layer of magenta (M) image (second continuous-tone image), each layer of yellow (Y) image (third continuous-tone image) and each layer of black (K) image (fourth continuous-tone image).

Then, the electronic device 2 calculates all the dithering masks of all colours of continuous-tone images (step S46).

In one embodiment of the present disclosed example, the electronic device 2 calculates the different colours of halftone image by the different initial masks. More specifically, he electronic device 2 make the same initial mask rotate the different angle values respectively, and make the rotated initial masks respectively use in the different half toning process respectively for different colours of continuous-tone images.

Figure 9A:
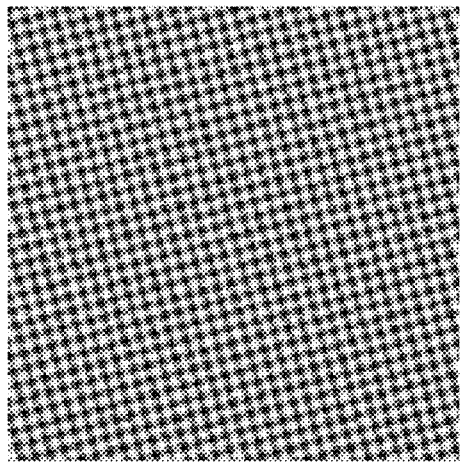
FIG. 9A is a first schematic view of an image of a halftone mask of the present disclosed example.
Figure 9B:
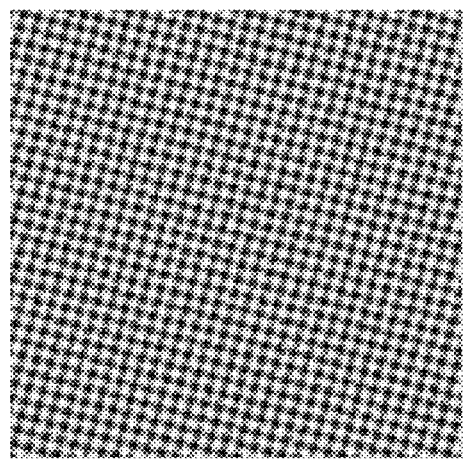
FIG. 9B is a second schematic view of an image of a halftone mask of the present disclosed example.
Figure 9C:
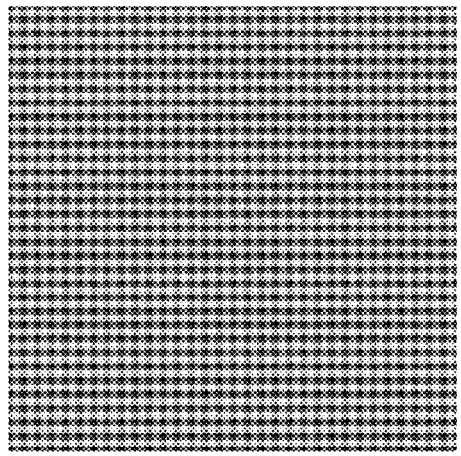
FIG. 9C is a third schematic view of an image of a halftone mask of the present disclosed example.
Figure 9D:
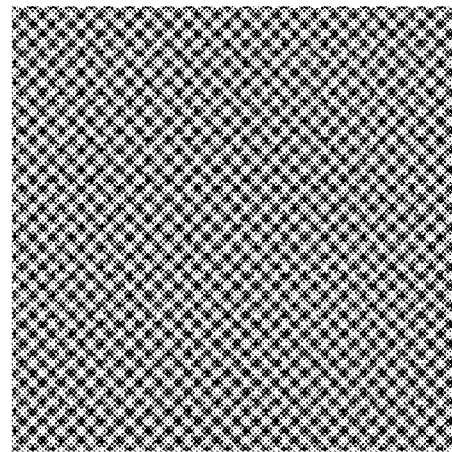
FIG. 9D is a fourth schematic view of an image of a halftone mask of the present disclosed example.

For example, please refer to FIG. 9A to FIG. 9D simultaneously, FIG. 9A is a first schematic view of an image of a halftone mask of the present disclosed example, FIG. 9B is a second schematic view of an image of a halftone mask of the present disclosed example, FIG. 9C is a third schematic view of an image of a halftone mask of the present disclosed example, FIG. 9D is a fourth schematic view of an image of a halftone mask of the present disclosed example.

The electronic device 2 can rotate the initial mask the different inclination angle values, and make the rotated initial masks respectively corresponding to the different inclination angle values as the different colours of initial masks. For example, the electronic device 2 can rotate the initial mask 15 degrees (as shown in FIG. 9A) and make the 15-degrees-rotated initial mask as the cyan initial mask (first initial mask), rotate the initial mask 75 degrees (as shown in FIG. 9B) and make the 75-degrees-rotated initial mask as the magenta initial mask (second initial mask), rotate the initial mask 90 degrees (as shown in FIG. 9C) and make the 90-degrees-rotated initial mask as the yellow initial mask (third initial mask), and rotate the initial mask 45 degrees (as shown in FIG. 9D) and make the 45-degrees-rotated initial mask as the black initial mask (fourth initial mask).

Besides, the electronic device 2 can calculate each layer of cyan dithering mask (first dithering mask) according to the plurality of the displacement values and the cyan initial mask, calculate each layer of magenta dithering mask (second dithering mask) according to the same group of the plurality of the displacement values and the magenta initial mask, calculate each layer of yellow dithering mask (third dithering mask) according to the same group of the plurality of the displacement values and the yellow initial mask, and calculate each layer of black dithering mask (fourth dithering mask) according to the same group of the plurality of the displacement values and the black initial mask. Abovementioned dithering masks of each colour respectively record the layer value.

Then, the electronic device 2 can performs the step S48 of the FIG. 5 to generate each layer of the cyan halftone image (first halftone image) according to each layer of cyan continuous-tone image and each layer of cyan dithering mask, generate each layer of the magenta halftone image (second halftone image) according to each layer of magenta continuous-tone image and each layer of magenta dithering mask, generate each layer of the cyan halftone image (first halftone image) according to each layer of cyan continuous-tone image and each layer of cyan dithering mask generate each layer of the yellow halftone image (third halftone image) according to each layer of yellow continuous-tone image and each layer of yellow dithering mask, and generate each layer of the black halftone image (fourth halftone image) according to each layer of black continuous-tone image and each layer of black dithering mask. Abovementioned halftone images of each colour respectively record the layer value.

Besides, when the multi-colour 3D print 1 performs the step S508 of FIG. 6, the multi-colour 3D print 1 controls four sub-nozzles respectively corresponding to the different colours to color the printed printing slice according to the same-layer (corresponding to the printed printing slice) of cyan halftone image, magenta halftone image, yellow halftone image and black halftone image.

Thus, this embodiment of the present disclosed example can effectively implement the full-colour 3D printing. Besides, the printed full-colour 3D physical model will not appear the obvious phenomenon of false contouring.

The above mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A method of slicing and printing multi-colour 3D objects, comprising:
    a) loading coordinate information of a multi-colour 3D object (22) and executing a path-slicing process to the coordinate information for generating a plurality of path data of a plurality of printing slices (S1-S3);
    b) loading a colour information of the multi-colour 3D object (22) and generating a plurality of continuous-tone images respectively corresponding to the plurality of the printing slices (S1-S3) according to the colour information;
    c) calculating a plurality of dithering masks respectively corresponding to the plurality of the printing slices (S1-S3) according to a plurality of displacement values and an initial mask;
    d) generating a plurality of halftone images respectively corresponding to the plurality of the printing slices (S1-S3) according to each dithering mask of a same layer and each continuous tone image of a same layer; and
    e) controlling a modeling nozzle (100) of a multi-colour 3D printer (1) to print the plurality of the printing slices (S1-S3) according to the plurality of the path data layer by layer and controlling a coloring nozzle (102) of the multi-colour 3D printer (1) to color each printed printing slice (S1-S3) according to the corresponded halftone image.

2. The method of slicing and printing multi-colour 3D object according to claim 1, wherein the step b) is to generate a plurality of first continuous-tone images, a plurality of second continuous-tone images, a plurality of third continuous-tone images and a plurality of fourth continuous-tone images according to the colour information.

3. The method of slicing and printing multi-colour 3D object according to claim 2, wherein the step c) is to calculate a plurality of first dithering masks respectively corresponding to the plurality of the printing slices (S1-S3) according to the plurality of the displacement values and a first initial mask, calculating a plurality of second dithering masks respectively corresponding to the plurality of the printing slices (S1-S3) according to the plurality of the displacement values and a second initial mask, calculating a plurality of third dithering masks respectively corresponding to the plurality of the printing slices (S1-S3) according to the plurality of the displacement values and a third initial mask, calculating a plurality of fourth dithering masks respectively corresponding to the plurality of the printing slices (S1-S3) according to the plurality of the displacement values and a fourth initial mask;

wherein the first initial mask, the second initial mask, the third initial mask, and the fourth initial mask are respectively corresponded to four different inclination angle values.

4. The method of slicing and printing multi-colour 3D object according to claim 3, wherein the step d) is to generate a plurality of first halftone images respectively corresponding to the plurality of the printing slices (S1-S3) according to each first dithering mask and the first continuous-tone image corresponding to the printing slice (S1-S3) of a same layer, generating a plurality of second halftone images respectively corresponding to the plurality of the printing slices (S1-S3) according to each second dithering mask and the second continuous-tone image corresponding to the printing slice (S1-S3) of the same layer, generating a plurality of third halftone images respectively corresponding to the plurality of the printing slices (S1-S3) according to each third dithering mask and the third continuous-tone image corresponding to the printing slice (S1-S3) of the same layer, generating a plurality of fourth halftone images respectively corresponding to the plurality of the printing slices (S1-S3) according to each fourth dithering mask and the fourth continuous-tone image corresponding to the printing slice (S1-S3) of the same layer.

5. The method of slicing and printing multi-colour 3D object according to claim 4, wherein the step e) is to respectively control four coloring nozzles (102) to color the printed printing slice (S1-S3) according to the first halftone image, the second halftone image, the third halftone image and the fourth halftone image which are corresponded to the printing slice (S1-S3) of the same layer.

6. The method of slicing and printing multi-colour 3D object according to claim 5, wherein each first halftone image, each second halftone image, each third halftone image and each fourth halftone image are a cyan image, a magenta image, a yellow and a black image respectively.

7. The method of slicing and printing multi-colour 3D object according to claim 1, wherein the step c) comprises:
   c1) calculating the displacement value of each layer according to a layer value of each printing slice and an unit displacement value of each printing slice (S1-S3); and
   c2) calculating the dithering mask of each layer according to each displacement value and the initial mask.

8. The method of slicing and printing multi-colour 3D object according to claim 1, wherein the step e) comprises:
   e1) loading one of the plurality of the path data;
   e2) controlling the modeling nozzle (100) to print one layer of the printing slice (S1-S3) according to the loaded path data;
   e3) controlling the coloring nozzle (102) to color the printing slice (S1-S3) according to the halftone image corresponding to the printing slice (S1-S3) when determining that the printing slice (S1-S3) need to be colored; and
   e4) performing the step e1) to the step e4) again for printing next layer of the printing slice (S1-S3) and coloring next layer of printing slice (S1-S3) when the printing slice (S1-S3) is not the last layer.

9. The method of slicing and printing multi-colour 3D object according to claim 1, wherein each path data comprises a plurality of coordinates, the halftone image records a plurality of colour-scale values respectively corresponding to the plurality of the coordinates.

10. The method of slicing and printing multi-colour 3D object according to claim 9, wherein the step e) is to control the coloring nozzle to move according to each coordinate, and executing coloring according to the corresponded colour-scale value.

11. The method of slicing and printing multi-colour 3D object according to claim 1, wherein each path data, each continuous-tone image, each dithering mask and each halftone image records a layer value of the corresponded printing slice (S1-S3) respectively.

* * * * *